No. 639,994. Patented Dec. 26, 1899.
F. KANE.
BELT FASTENER.
(Application filed Feb. 7, 1899.)

(No Model.)

Witnesses
Samuel Stuart
James Wood

Inventor
Frank Kane
By Geo. E. Hazelton
Atty

THE NORRIS PETERS CO., PHOTO-LITHO., WASHINGTON, D. C.

UNITED STATES PATENT OFFICE.

FRANK KANE, OF PHILADELPHIA, PENNSYLVANIA, ASSIGNOR OF ONE-FOURTH TO HUGH E. LAWRENCE, OF SAME PLACE.

BELT-FASTENER.

SPECIFICATION forming part of Letters Patent No. 639,994, dated December 26, 1899.

Application filed February 7, 1899. Serial No. 704,822. (No model.)

*To all whom it may concern:*

Be it known that I, FRANK KANE, a citizen of the United States, residing at Philadelphia, county of Philadelphia, and State of Pennsylvania, have invented a certain new and useful Improvement in Belt-Fasteners, of which the following is a specification.

My invention relates to a new and useful improvement in belt-fasteners, and has for its object to provide a simple, cheap, and effective device of this description which may be attached by screws to the meeting ends of a belt for driving machinery and when so attached will permit the belt to be tightened or loosened within certain limits to permit its ends to be uncoupled with but little effort.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1:
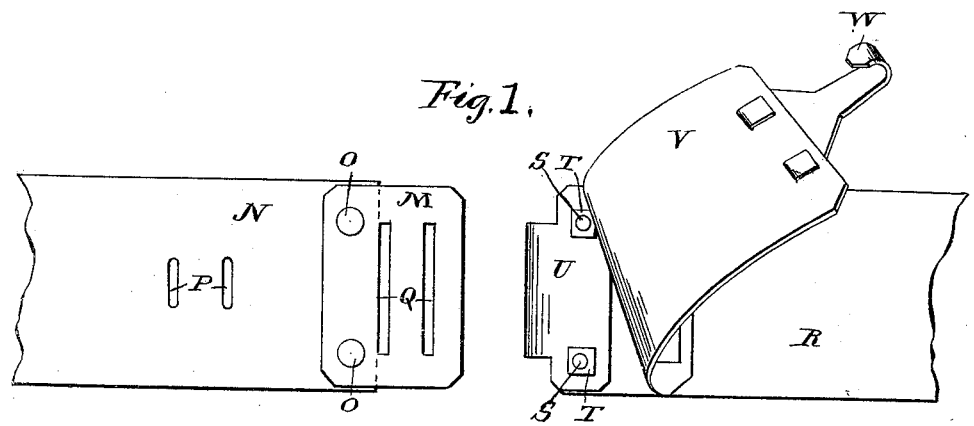
Figure 2:
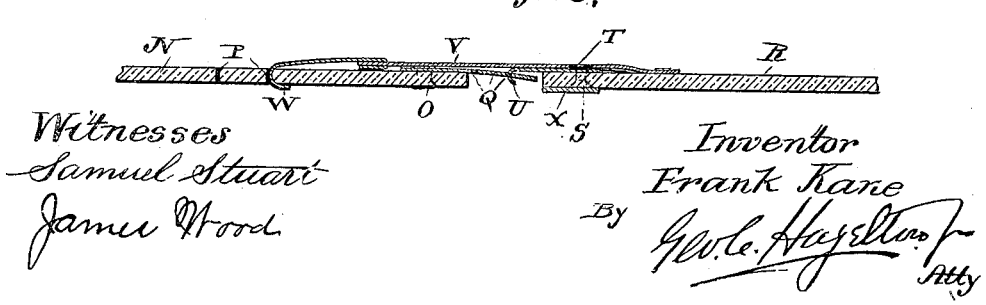

Figure 1 is a view showing the meeting ends of the belt having my improvement attached thereto prior to being coupled together; and Fig. 2, a longitudinal section thereof, showing the ends of the belt fastened together by my improvement.

As here embodied, my invention consists of the section M, which is secured to the end N of the belt by the rivets O, and this end of the belt has formed therein the slots P, and the section M has the slots Q, which correspond in position to the slots P, for the purpose hereinafter set forth. The end R of the belt has attached thereto by the screws S and nuts T the hook section U, this hook being adapted to engage the slots Q, and thus couple the ends of the belt together in a substantial manner, while permitting the adjustment thereof by reason of there being more than one slot Q.

In order that the belt may run smoothly over the pulleys and not make an undue noise by the contact of the fastener with the pulleys, I provide a flap V, which is attached to the end R and adapted to cover the sections M and U, and thus protect the same from contact with the pulleys. This flap also serves to hold the hook U in engagement with the slots in the section M. In order that this flap may be held in position, a hook W is attached to the free end thereof and adapted to engage with one of the slots P when the hook U is in engagement with one of the slots Q, as clearly shown in Fig. 2. In this construction it is not desirable that the section M be disturbed so long as the belt is in condition to be used, since by so doing its relation to the slots P would be altered, thus necessitating the formation of new slots, and therefore this section may be riveted to the belt; but the section U is preferably attached by screws and nuts, in order that it may be readily removed to provide for the shortening of the belt when occasion may require; but as there may be any reasonable number of the slots Q and P a considerable amount of slack may be taken up without altering the section U, and this may be done by a person of little or no skill in belt-lacing, which in the case of heavy belts requires considerable skill by the ordinary method, as well as much loss of time and uncertainty in adjusting the belt to the proper tension, all of which is entirely overcome by my improvement.

In attaching the ends of the belt by the fastener when the hook U has engaged the inner slot in the section N the outer end of said section passes beyond the opposite end R, and to prevent the wearing of the belt proper by this section in use I place a strip of leather X against the outer surface of the belt at this point and attach it in any suitable manner which will receive the contact of the section M, and consequently the wear incident to the movements of the belt.

The cost of manufacture of my improved fastener is comparatively small, since it is made entirely of sheet metal and of such shapes as are readily stamped by automatic machinery, requiring but little handwork.

Having thus fully described my invention, what I claim as new and useful is—

A belt-fastener consisting of a section having slots therein adapted to be secured to one end of a belt, a hook-section, screws and nuts for securing the same to the opposite end of the belt, said hook-section being adapted to engage the slots in the first-named section, a flap carried by one end of the belt adapted to cover the fastener, and a hook attached to the flap and adapted to engage slots within the opposite end of the belt, as shown and described.

In testimony whereof I have hereunto affixed my signature in the presence of two subscribing witnesses.

FRANK KANE.

Witnesses:
 HUGH LAWRENCE,
 JOS. STOREY.